(12) United States Patent
Saurav et al.

(10) Patent No.: US 11,025,418 B2
(45) Date of Patent: *Jun. 1, 2021

(54) CRYPTOGRAPHIC ENTROPY TREE

(71) Applicant: Apple Inc., Cupertino, CA (US)

(72) Inventors: Kumar Saurav, Santa Clara, CA (US); Jerrold V. Hauck, Windermere, CA (US); Yannick L. Sierra, San Francisco, CA (US); Charles E. Gray, San Francisco, CA (US); Roberto G. Yepez, San Fracisco, CA (US); Samuel Gosselin, San Francisco, CA (US); Petr Kostka, Prague (CZ); Wade Benson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/436,328

(22) Filed: Jun. 10, 2019

(65) Prior Publication Data

US 2019/0296905 A1    Sep. 26, 2019

Related U.S. Application Data

(63) Continuation of application No. 15/274,816, filed on Sep. 23, 2016, now Pat. No. 10,320,563.

(51) Int. Cl.
*H04L 9/08* (2006.01)
*G06F 21/60* (2013.01)
*G06F 21/74* (2013.01)

(52) U.S. Cl.
CPC .......... *H04L 9/0861* (2013.01); *G06F 21/602* (2013.01); *G06F 21/74* (2013.01); *H04L 9/0891* (2013.01); *H04L 9/0897* (2013.01)

(58) Field of Classification Search
CPC . H04L 9/0861; H04L 9/0894; H04L 2209/24; G06F 21/602
See application file for complete search history.

(56) References Cited

U.S. PATENT DOCUMENTS

| | | | |
|---|---|---|---|
| 9,081,805 B1 * | 7/2015 | Stamen | G06F 9/5027 |
| 2004/0052377 A1 * | 3/2004 | Mattox | H04N 21/26606 380/277 |
| 2006/0230439 A1 * | 10/2006 | Smith | H04L 63/061 726/9 |
| 2008/0084273 A1 * | 4/2008 | Rodgers | G06F 21/6209 340/5.21 |
| 2008/0270790 A1 * | 10/2008 | Brickell | G06F 21/57 713/158 |
| 2009/0106563 A1 * | 4/2009 | Cherpantier | G06F 21/86 713/194 |
| 2013/0346747 A1 * | 12/2013 | Ignatchenko | G06F 21/6209 713/158 |

(Continued)

*Primary Examiner* — Meng Li
(74) *Attorney, Agent, or Firm* — Kowert, Hood, Munyon, Rankin & Goetzel, P.C.

(57) ABSTRACT

A device may include a secure processor and a secure memory coupled to the secure processor. The secure memory may be inaccessible to other device systems. The secure processor may store some keys and/or entropy values in the secure memory and other keys and/or entropy values outside the secure memory. The keys and/or entropy values stored outside the secure memory may be encrypted using information stored inside the secure memory.

20 Claims, 18 Drawing Sheets

(56) References Cited

U.S. PATENT DOCUMENTS

| | | | |
|---|---|---|---|
| 2014/0089617 A1* | 3/2014 | Polzin | G06F 12/14 |
| | | | 711/163 |
| 2015/0078550 A1 | 3/2015 | Ferguson et al. | |
| 2015/0288514 A1* | 10/2015 | Pahl | H04L 63/166 |
| | | | 713/171 |
| 2017/0052906 A1* | 2/2017 | Lea | G06F 12/1408 |
| 2017/0132433 A1* | 5/2017 | Srinivasan | H04L 9/3263 |

* cited by examiner

CRYPTOGRAPHIC ENTROPY TREE

The present application is a continuation of U.S. application Ser. No. 15/274,816, filed Sep. 23, 2016; the disclosure of which is incorporated by reference herein in its entirety.

TECHNICAL FIELD

The disclosure generally relates to generating and storing keys for securing data.

BACKGROUND

Many computing devices use cryptographic keys to secure data stored in device memory. Data can be encrypted using a cryptographic algorithm. Once encrypted, the data may only be readable by users in possession of the correct key. To safeguard against unauthorized data access, computing devices should keep the keys secure.

A computing device may employ several keys. For example, a computing device may have a plurality of user accounts. Each user account can require a separate key for access to the device's file system and/or applications. Specific portions of the device's file system may be secured by keys. Specific applications may require keys to run and/or to provide certain functions. In some implementations, not only may the file system and individual applications require separate keys, but these keys may differ among user accounts. For example, user 1 may use key 1 to access application 1, but user 2 may use key 2 to access application 1.

SUMMARY

Some computing devices may include a secure enclave processor (SEP) and an SEP memory. The SEP memory may be accessible to the SEP but inaccessible to other elements of the device, such as the main processor of the device. To prevent unauthorized users from obtaining keys to which they are not entitled, these computing devices may store keys in SEP memory. However, the SEP memory may only provide a limited amount of storage space for the keys.

Systems and methods described herein may extend the available storage space for keys by storing keys in generally accessible device storage. For example, the accessible keys may be stored in the device's file system. The accessible keys may be encrypted by the SEP, and the key or keys for decrypting the accessible keys may be stored in SEP memory. Accordingly, the SEP may protect the accessible keys without storing them in SEP memory.

Particular implementations provide at least the following advantages. The SEP can provide security by encrypting accessible keys using a combination of a general SEP key and entropy (e.g., a random number or random data value generated by the SEP). Keys can be isolated to separate operating system, service, and/or user instances because SEP may encrypt keys for each instance using different entropies. Accordingly, separate accounts can be separately encrypted, providing cryptographic isolation for files only accessible to specific users. Using entropy to generate keys can prevent one user from guessing another user's key, because the key is random rather than counter-based. Storing keys in accessible memory and securing the accessible keys with the SEP can extend the number of keys that can be used beyond the number that can be stored in SEP memory. Keys in accessible memory can be invalidated in bulk by resetting stored entropy values in SEP memory.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

SEP-Equipped Devices

Computing devices described herein may include a plurality of data sets that can be independently secured. For example, a computing device may include a plurality of operating system (OS) partitions, with each partition requiring a different key to access. Each OS partition may include a plurality of device services and/or applications, each of which may require a different key to access. Each service and/or application may in turn include a plurality of user accounts, each of which may require a different key to access.

The computing device may use a secure enclave processor (SEP) to encrypt and decrypt each key. For example, the SEP may be configured to create keys and encrypt them using a root key and an entropy value (e.g., a random number). When a user wishes to access data secured by a key, the user may supply a credential to the SEP. If the credential is correct, the SEP can decrypt the key. The SEP can use secure, encrypted memory that is isolated from other computing device systems. Accordingly, the SEP can provide security for each partition, service, and/or user separately without allowing a user only authorized for one OS partition to gain access to another OS partition, for example. Systems and methods described herein allow the SEP to create and protect more keys than may otherwise fit in the secure memory by leveraging the device file system in a secure manner.

Figure 1:
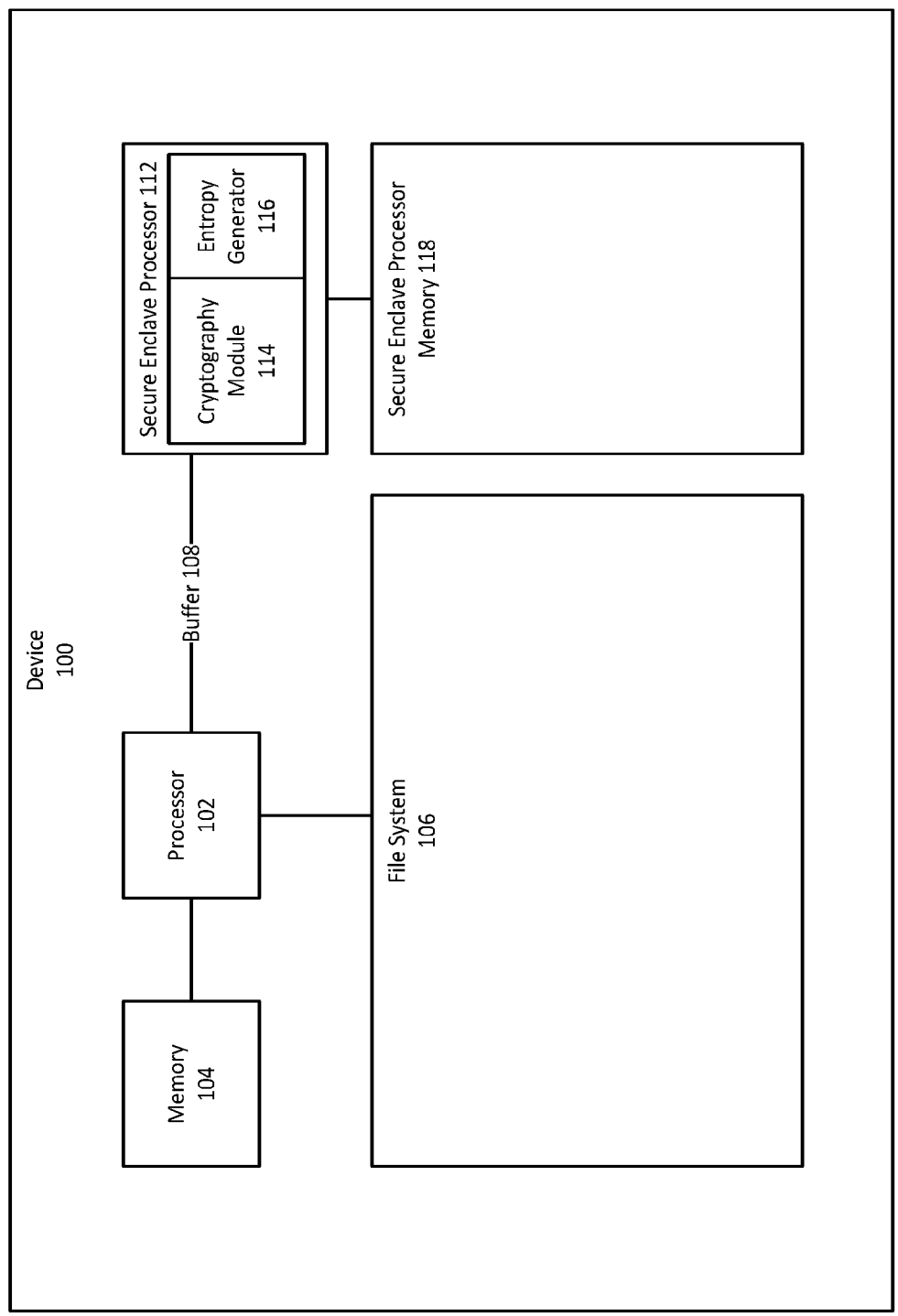
FIG. 1 is a block diagram of an example device comprising a secure enclave processor (SEP).

FIG. 1 is a block diagram of an example computing device 100 comprising an SEP 112. Device 100 may be one of a variety of electronic devices including, but not limited to, laptop computers, desktop computers, computer terminals, television systems, tablet computers, e-book readers, smart phones, smart watches, and wearable computers, for example. Device 100 may include one or more processors 102 configured to execute instructions, memory 104 configured to store instructions for execution by processor 102, and file system 106 comprising one or more storage devices such as solid state disks or hard drives. File system 106 may be configured to store data accessible by processor 102. In some embodiments, file system 106 may be partitioned logically and/or physically, but all partitions of file system 106 may be accessible by processor 102. Device 100 may include other elements such as memory controllers, display devices and display device controllers, input devices (e.g., fingerprint scanners) and input device controllers, sensors, etc.

Device 100 may include a secure enclave processor (SEP) 112. In some implementations, SEP 112 may be a coprocessor fabricated in processor 102 but cryptographically secured from access by processor 102. In other implementations, SEP 112 may be separate from processor 102. Processor 102 and SEP 112 may communicate with one another using shared memory buffer 108. For example, processor 102 may place data for SEP 112 in buffer 108 and send an interrupt (e.g., a signal, a message, etc.) to SEP 112, causing SEP 112 to read data from the buffer 108. Similarly, SEP 112 may place data for processor 102 in buffer 108 and send an interrupt to processor 102, causing processor 102 to read data from the buffer 108. SEP 112 may run an operating system such as iOS, watchOS, a real time operating system, an operating system for embedded systems, or a Linux variant. SEP 112 may perform its own secure boot and may be updated using a software update process that is separate from processor 102. SEP 112 may be provisioned during fabrication with a unique ID (UID) unknown to and inaccessible by other parts of device 100.

SEP 112 may control access to buffer 108 to provide SEP 112 isolation from other device 100 components. For example, buffer 108 may comprise a filter and a secure mailbox. The filter may comprise circuitry configured to tightly control access to SEP 112. For example, the filter may permit read/write operations from processor 102 to enter SEP 112 only if the operations address the secure mailbox. SEP 112 may restrict other operations from entering buffer 108. In some implementations, the filter may permit write operations to an address assigned to an inbox portion of the secure mailbox and read operations to an address assigned to an outbox portion of the secure mailbox. All other read/write operations may be prevented/filtered by buffer 108. In some embodiments, buffer 108 may respond to other read/write operations with an error. For example, buffer 108 may sink write data associated with a filtered write operation without passing the write data on to SEP 112. In some embodiments, the filter may supply nonce data as read data for a filtered read operation. Nonce data (e.g., "garbage data") may comprise data that is not associated with the addressed resource within SEP 112. The filter may supply any data as nonce data (e.g. all zeros, all ones, random data from a random number generator, data programmed into the filter to respond as read data, the address of the read transaction, etc.).

The secure mailbox may comprise circuitry that includes an inbox and an outbox. Both the inbox and the outbox may be first-in, first-out buffers (FIFOs) for data. The buffers may have any size (e.g. any number of entries, where each entry is capable of storing data from a read/write operation). For example, the inbox may be configured to store write data from write operations sourced from processor 102. The outbox may store write data from write operations sourced by processor 102.

In some embodiments, software executing on processor 102 may request services of SEP 112 using an application programming interface (API) supported by an operating system of device 100. For example, a requester may make API calls that request services of SEP 112. These calls may cause an operating system executing on processor 102 to write corresponding requests to buffer 108. SEP 112 may retrieve these requests from the mailbox and analyze the requests to determine whether SEP 112 should service the request. For example, processor 102 can use the API to request creation of keys. By isolating SEP 112 in this manner, secrecy of data stored in SEP memory 118 may be enhanced. SEP 112 may include and/or may be coupled to SEP memory 118. SEP memory 118 may be accessible only by SEP 112. For example, other device 100 systems such as processor 102 may be isolated from SEP memory 118. In some implementations, SEP memory 118 may be encrypted. In some implementations, SEP memory 118 may be any variety of non-volatile storage mechanism configured to store a limited amount of data.

SEP 112 may include cryptography module 114 configured to perform cryptographic operations for key management as described below. For example, cryptography module 114 may create keys for storage in SEP memory 118. Cryptography module 114 may create and encrypt keys for storage in file system 106. Cryptography module 114 may handle data access requests, for example by receiving access requests and credentials from processor 102 and, if the credentials match those expected for decrypting a corresponding key, decrypting the key and returning the decrypted key to processor 102. Cryptography module 114 may implement any suitable encryption algorithm such as Data Encryption Standard (DES), Advanced Encryption Standard (AES), Rivest Shamir Adleman (RSA), Elliptic Curve Cryptography (ECC), etc.

SEP 112 may include entropy generator 116. Entropy generator 116 may be configured to generate random (or pseudorandom) numbers. For example, entropy generator 116 may comprise a hardware random number generator. As described below, cryptographic module 114 may use random numbers ("entropy values") generated by entropy generator 116 to create, modify, and/or invalidate keys.

Entropy Trees

Figure 2A:
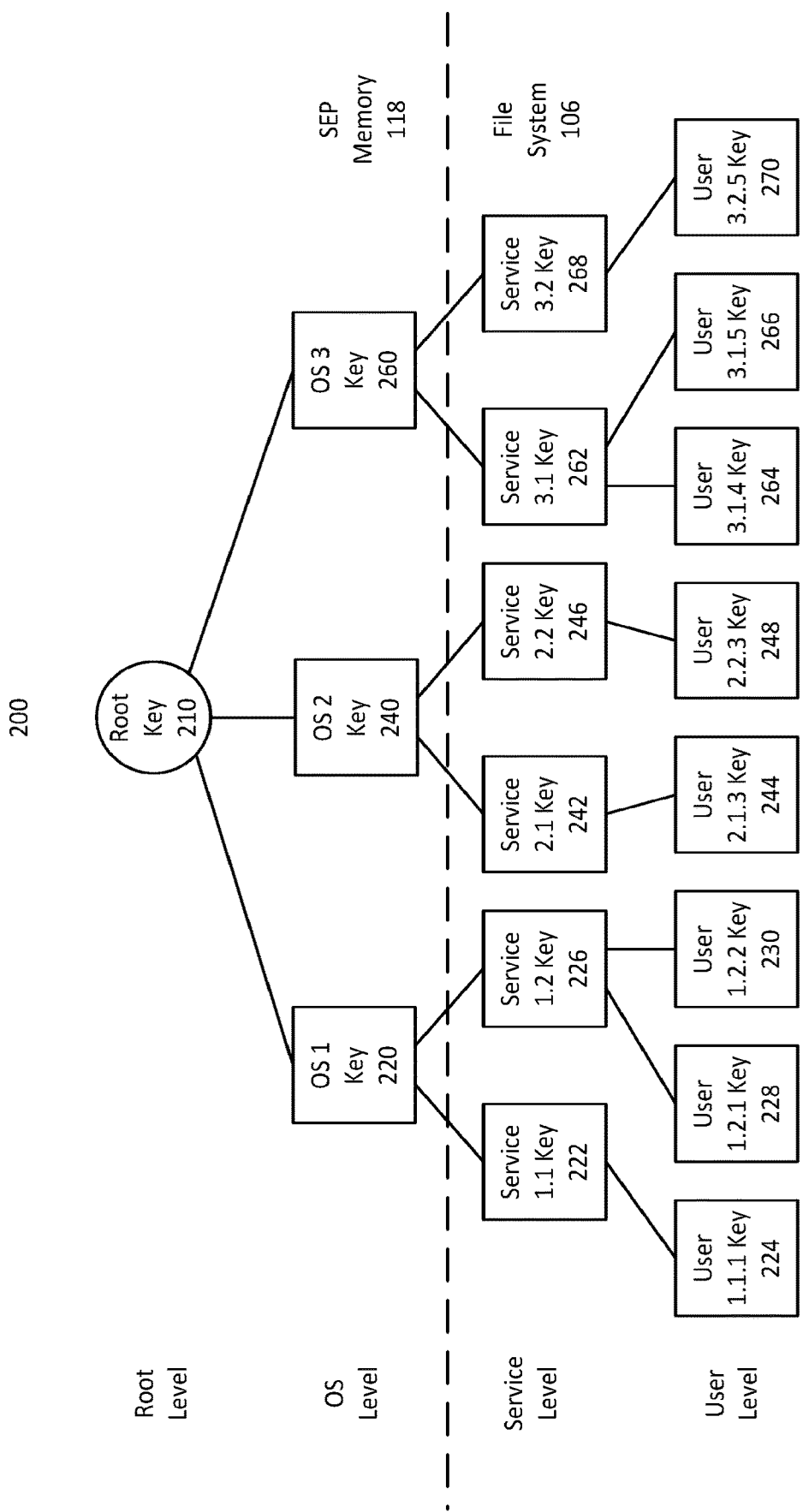
FIGS. 2A and 2B are diagrams of example entropy trees.
Figure 2B:
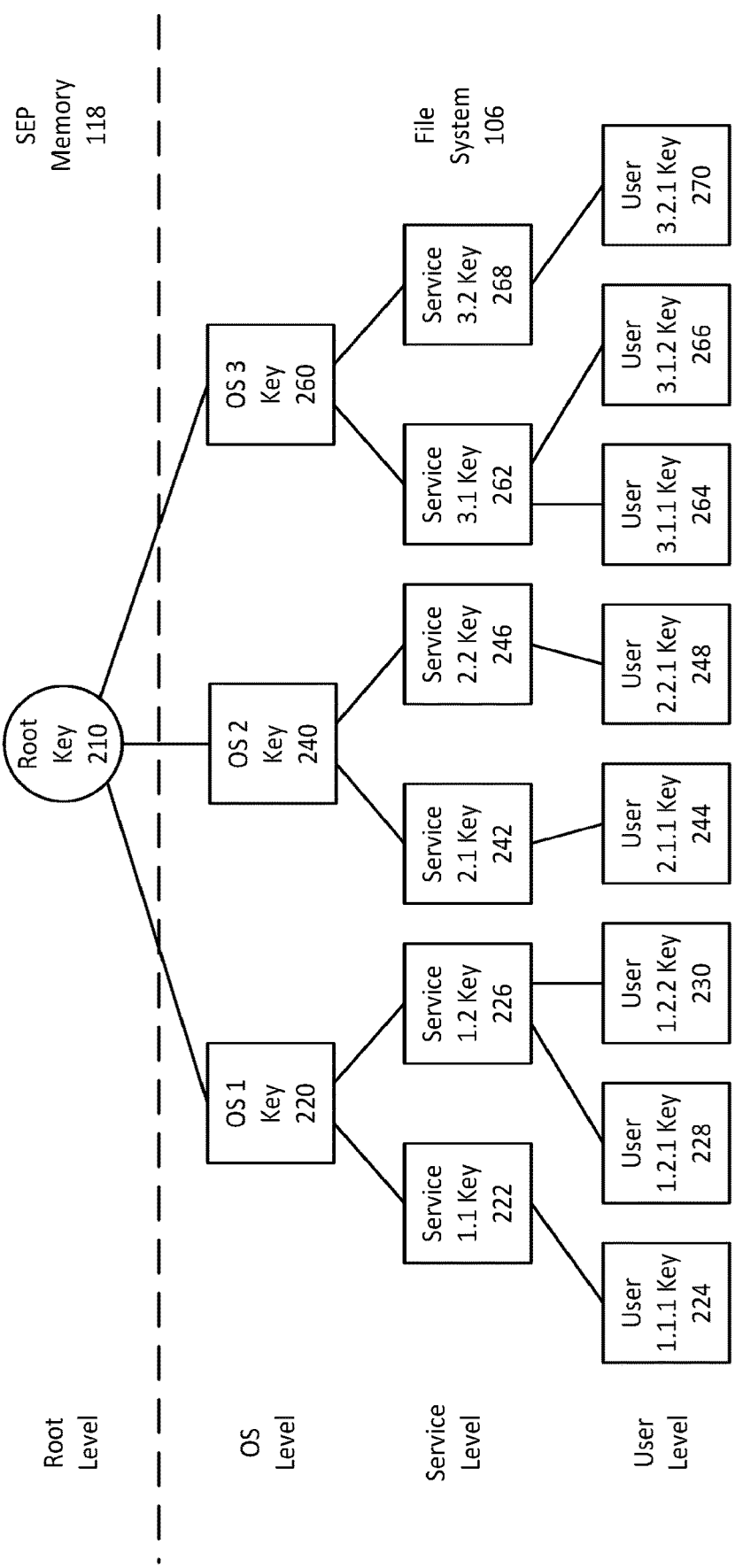

FIGS. 2A and 2B are diagrams of example entropy trees 200 and 201. SEP 112 may generate keys conceptually related to one another through an entropy tree structure. In some implementations, SEP 112 may generate a root key and use the root key to generate keys at a first level of the tree. SEP 112 may use the first level keys to generate keys for a second level of the tree, and so on. For example, entropy tree 200 includes four levels, a root level, an OS level, a service level, and a user level. Other embodiments may include fewer levels or more levels than the example of FIG. 2A.

The root level may include root key 210 that may be tied to SEP 112 hardware. For example, root key 210 may be derived from or generated from the UID (e.g., unique identifier) of SEP 112 and a root entropy value generated by SEP 112. For example, the UID of SEP 112 may be obtained from SEP 112. The entropy can be generated by SEP 112 and stored within memory SEP 112 so that root key 210 can be regenerated from the UID and entropy as needed.

The OS level may include one or more keys for one or more OS instances for device 100. For example, OS 1 key 220 may be a key for an OS instance installed on a first partition of an SSD in file system 106. OS 2 key 240 may be a key for an OS instance installed on a second partition of the SSD in file system 106. OS 3 key 230 may be a key for an OS instance installed on an external hard drive in file system 106.

The service level may include one or more keys for one or more services provided within the OS instances. For example, service 1 may be a service for unlocking device 100 using a fingerprint reader. Service 2 may be a service for securely paying for goods and services with a credit card number stored by device 100. Other implementations may provide service keys for other services, such as login and/or access interfaces for online services, access services for secured files in file system 106, and/or applications running in the OS instance. Service 1.1 key 222 may be a key for the unlocking service in OS 2, service 1.2 key 226 may be a key for the payment service in OS 1, service 2.1 key 242 may be a key for the unlocking service in OS 2, service 2.2 key 246 may be a key for the payment service in OS 2, service 3.1 key 262 may be a key for the unlocking service in OS 3, and service 3.2 key 268 may be a key for the payment service in OS 3.

The user level may include one or more keys for individual users of the services provided with the OS instances. User level keys may be used to encrypt data associated with individual user's service accounts. For example, given that file system 106 access may be a service, user level keys may be used to secure any information a user wishes to keep confidential. For example, secured data may include email, photos, text messages, contact information, calendar information, documents, the contents of a user's home directory or desktop directory, device configuration information, credentials for logging into various websites and services, etc. FIG. 2A depicts five users (users 1-5). User 1.1.1 key 224 may be a key for user 1's account with the unlocking service in OS 1, user 1.2.1 key 228 may be a key for user 1's account with the payment service in OS 1, user 1.2.2 key 230 may be a key for user 2's account with the payment service in OS 1, user 2.1.3 key may be a key for user 3's account with the unlocking service in OS 2, user 2.2.3 key may be a key for user 3's account with the payment service in OS 2, user 3.1.4 key 264 may be a key for user 4's account with the unlocking service in OS 3, user 3.1.5 key 266 may be a key for user 5's account with the unlocking service in OS 3, and user 3.2.5 key 270 may be a key for user 5's account with the payment service in OS 3.

Each level in entropy tree 200 may depend on the level above. For example, SEP 112 may encrypt a combination of the UID and an entropy value to generate root key 210. SEP 112 may execute a key derivation function with root key 210 and an entropy value as inputs to generate an OS key (e.g., OS 1 key 220) for an OS operating on device 100. SEP 112 may execute a key derivation function with an OS key (e.g., OS 1 key 220) and an entropy value as inputs to generate a service key (e.g., service 1.1 key 222) for a service executed within the OS. SEP 112 may execute a key derivation function with a service key (e.g., service 1.1 key 222) and an entropy value as inputs to generate a user key (e.g., user 1.1.1 key 224) for a user of the service.

Entropy tree 200 provides OS level isolation of keys, service level isolation of keys, and user level isolation of keys. Isolation of keys may provide that a user with credentials for one key at a given level cannot use the same credentials to access another key at the same level. For example, a user with permission to decrypt OS 1 key 220 does not, by virtue of having that permission, have permission to decrypt OS 2 key 240 or OS 3 key 260. Because separate accounts can have different keys, if a user logs into a first account, there may be no way for the user to access information available through login to a second account.

A portion of entropy tree 200 may be stored in SEP memory 118, and the remainder of entropy tree 200 may be stored in file system 106. For example, the structure of entropy tree 200 may result in exponential growth of key numbers, as there can be separate keys for each instance of OS, service, and user. As shown in FIG. 2A, each OS key may have one or more service keys dependent on the OS key, and each service key may have one or more user keys dependent on the service key. Accordingly, to avoid running out of space in SEP memory 118, lower level keys (e.g., service keys and user keys) may be stored in file system 106.

SEP 112 may encrypt any keys to be stored in file system 106 prior to storage. SEP 112 may encrypt a key by performing a cryptographic hash on the key and a lowest-level key within SEP memory 118 from which the key depends. For example, in entropy tree 200, OS level keys are the lowest-level keys stored in SEP memory 118, as they are at a lower level in entropy tree 200 than root key 210. Accordingly, SEP 112 may use OS 1 key 220 to encrypt service 1.1. key 222 or user 1.2.2 key 230, for example.

FIG. 2B illustrates another example entropy tree 201. Entropy tree 201 is an alternative embodiment of entropy tree 200 wherein OS keys 220, 240, and 260 are encrypted and stored in file system 106. In this embodiment, all keys at the OS level, service level, and user level may be encrypted using root key 210, as root key 210 is the lowest-level (and only) key stored in SEP memory 118.

Key Creation and Invalidation

Figure 3A:
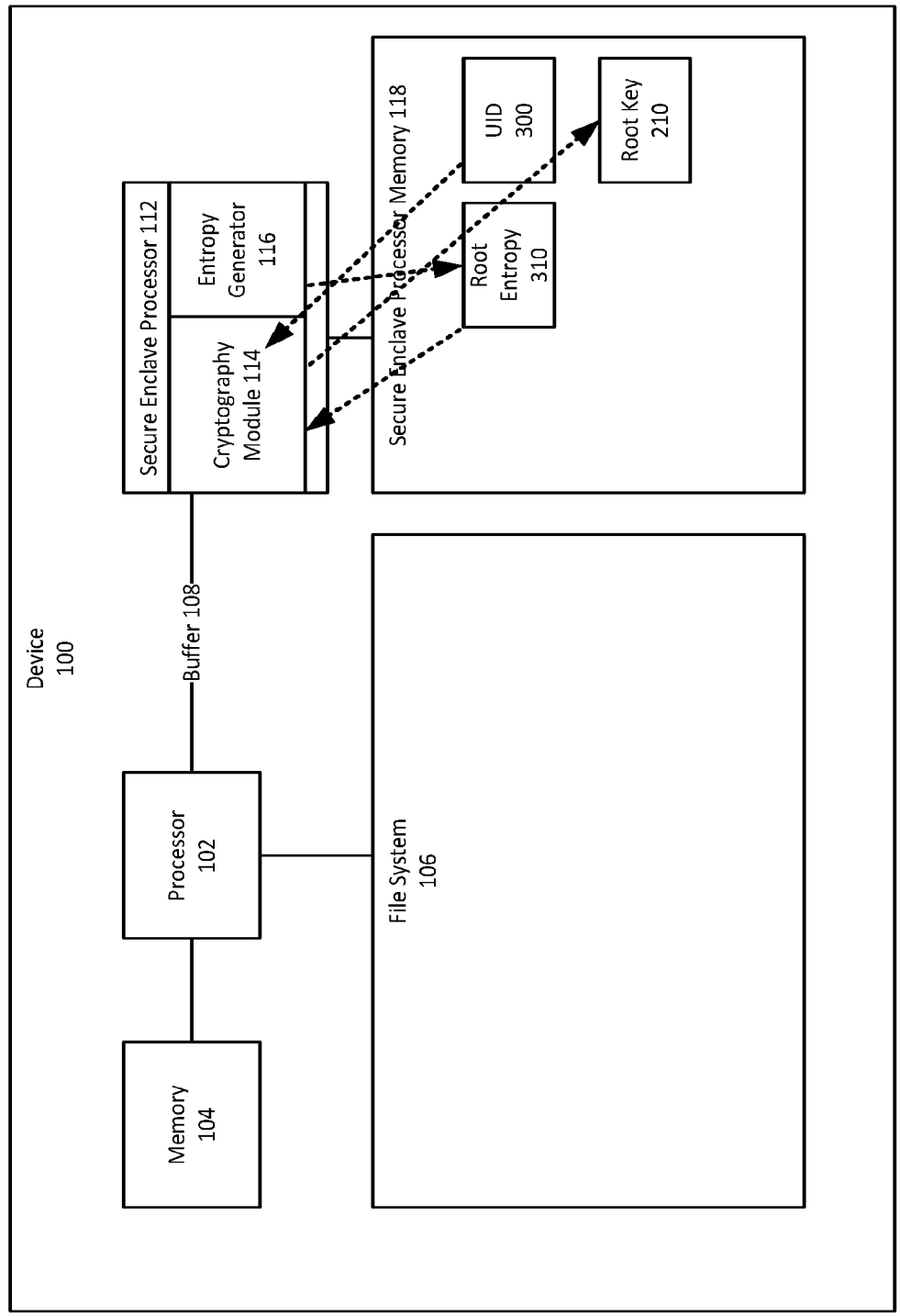
FIG. 3A illustrates an example of root key creation.

FIG. 3A illustrates an example of root key creation. SEP 112 may have UID 300. UID 300 may be stored in SEP memory 118. To create root key 210, entropy generator 116 may generate root entropy 310. Then, SEP 112 may apply a cryptographic function to UID 300 using root entropy 310 as a cryptographic function seed, yielding root key 210. For example, SEP 112 may apply a 256-bit AES cipher block chaining (AES-256-CBC) or other suitable function. SEP 112 may store root entropy 310 and root key 210 in SEP memory 118.

Figure 3B:
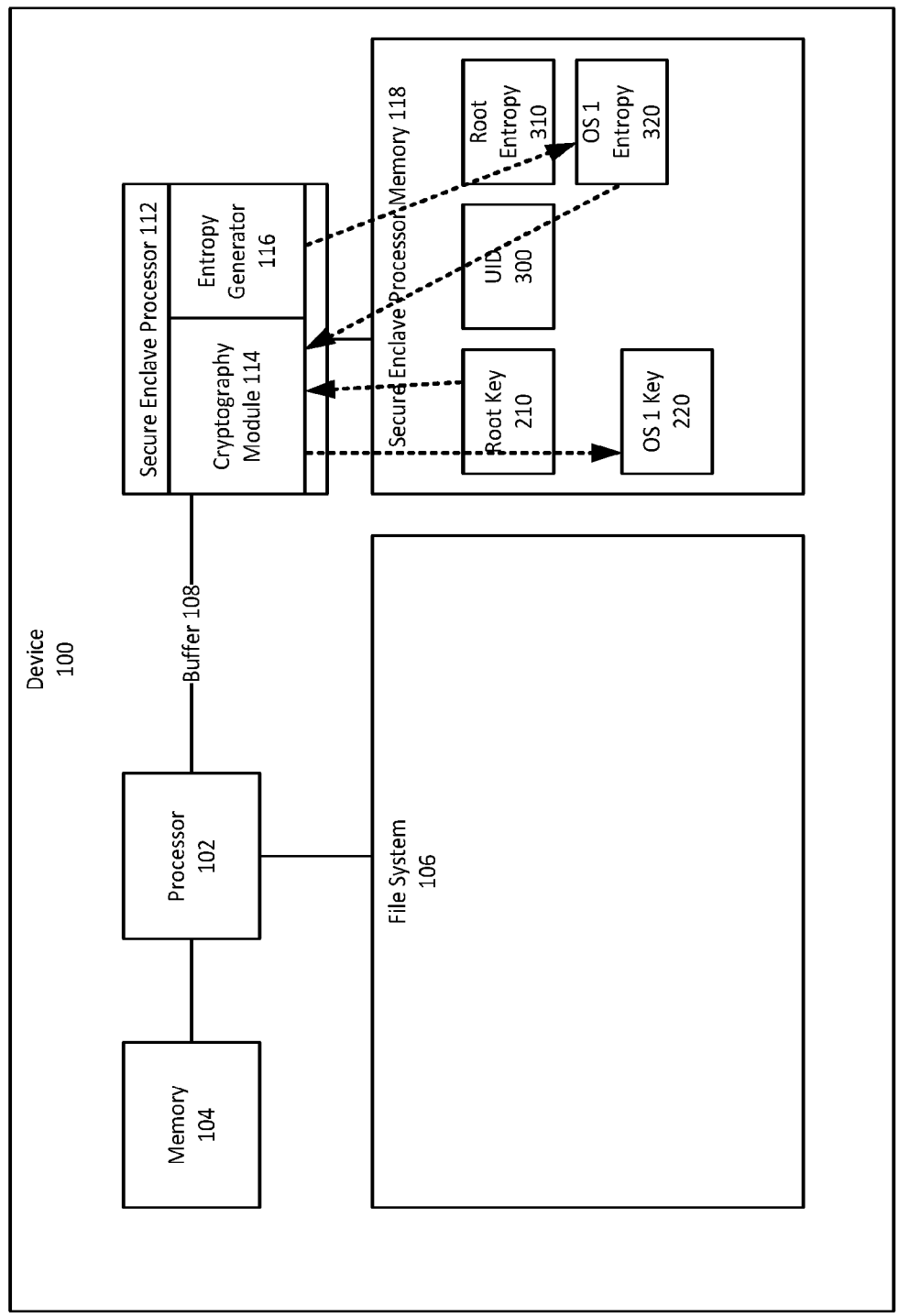
FIG. 3B illustrates an example of initial key creation for entropy stored in SEP memory.

FIG. 3B illustrates an example of initial key creation for entropy stored in SEP memory 118. For example, SEP 112 may store OS entropy in SEP memory 118 when the entropy tree 200 embodiment of FIG. 2A is adopted by device 100. In the example of FIG. 3B, OS 1 entropy 320 is shown in SEP memory 118, but SEP memory 118 may store additional OS entropies (e.g., OS 2 entropy and OS 3 entropy). In some implementations, SEP memory 118 may store up to 48 OS entropies.

SEP 112 may use entropy to generate OS keys. Entropy generator 116 may generate OS 1 entropy 320. Cryptography module 114 may apply a hash function to root key 210 using OS 1 entropy 320 as a seed, yielding OS 1 key 220. For example, cryptography module 114 may apply a key derivation function based on a hash message authentication code (HKDF) or other suitable function. SEP 112 may store OS 1 entropy 320 in SEP memory 118. SEP 112 may dynamically generate OS 1 key 220 from root key 210 and OS 1 entropy. OS 1 key 220 and OS 1 entropy 320 may not be stored in file system 106.

Figure 3C:
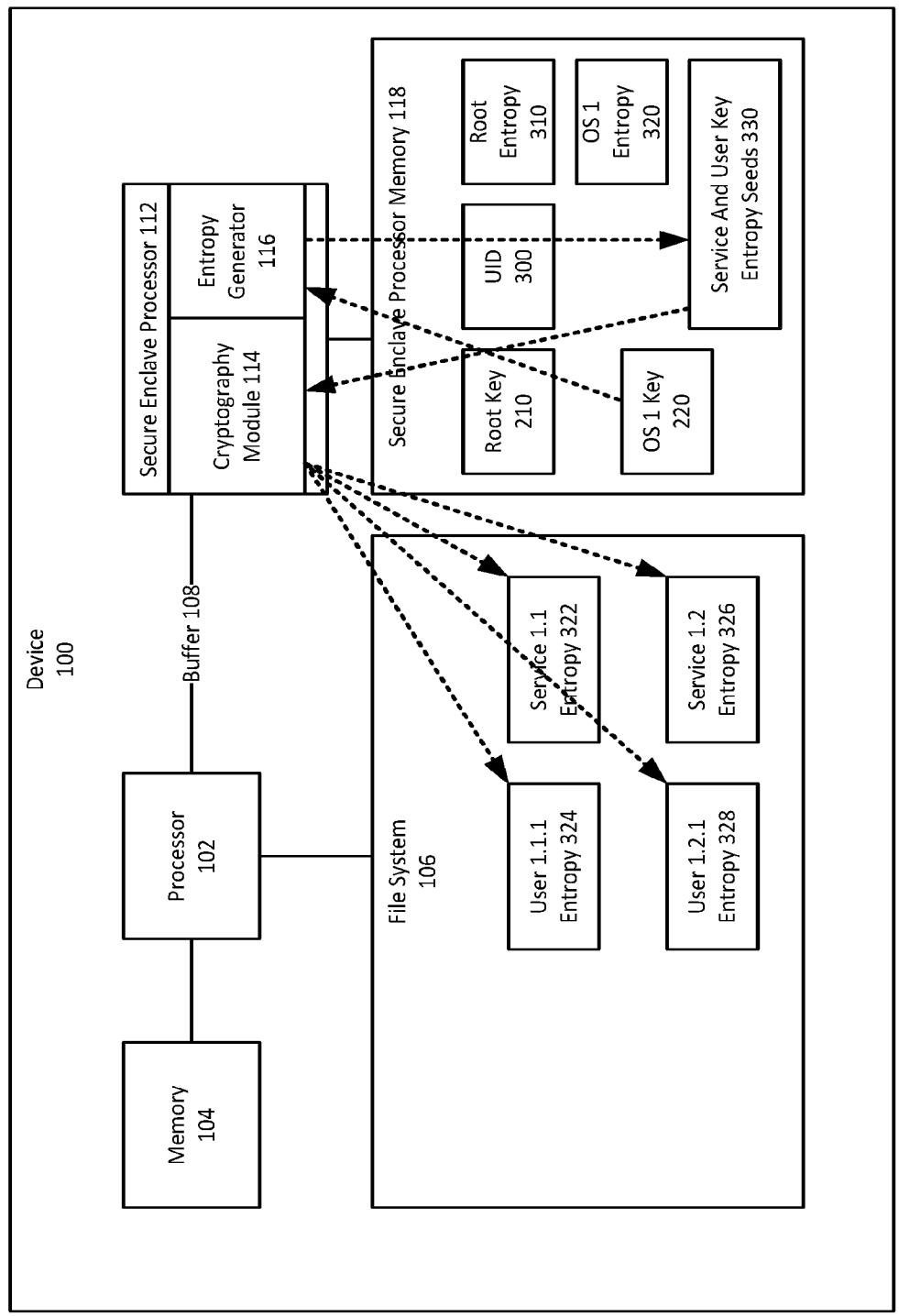
FIG. 3C illustrates an example of initial entropy creation for entropies stored in a file system.

FIG. 3C illustrates an example of initial entropy creation for entropies stored in file system 106. For example, SEP 112 may send service entropies and user entropies to processor 102 for storage in file system 106 when the entropy tree 200 embodiment of FIG. 2A is adopted by device 100. In the example of FIG. 3C, service 1.1 entropy 322, user 1.1.1 entropy 324, service 1.2 entropy 326, and user 1.2.1 entropy 328 are shown in file system 106, but file system 106 may store additional entropies. For example, file system 106 may store other service and user entropies used to create keys from FIG. 2A, including service and user entropies associated with different OS key branches of entropy tree 200.

SEP 112 may generate and encrypt entropies to be stored in file system 106. For example, a service within an OS instance (e.g., OS 1) may request a key generation by SEP 112. A service may request a key upon a first use of the service within the OS instance or when a new user uses the service within the OS instance, for example. Processor 102 may generate the request and send the request to SEP 112 through buffer 108. As part of initial key generation, SEP 112 may generate one or more entropy values used as seeds for generating the key. As keys may be generated dynamically upon request, the entropy values may be stored to facilitate future key generation requests. For example, entropy generator 116 may generate one or more entropy seeds 330. Entropy seeds 330 may be the entropies that are later encrypted and stored in file system 106. In some implementations, entropy generator 116 may generate a unique entropy seed 330 responsive to each key generation request. Accordingly, entropy generator 116 may generate a unique entropy seed 330 for each key at the time of key creation. SEP 112 may store entropy seeds 330 in SEP memory 118. Cryptography module 114 may apply a hash function to root key 210 and/or the OS key for the current OS instance (e.g., OS 1 key 220) using entropy seed 330 as a seed, yielding the requested key. For example, cryptography module 114 may apply HKDF or another suitable function. Cryptography module 114 may encrypt entropy seed 330. For example, cryptography module 114 may apply AES-256-CBC or another suitable function. SEP 112 may send the encrypted entropy through buffer 108 to processor 102 for storage in file system 106. SEP 112 may purge entropy seeds 330 from SEP memory 118 when corresponding encrypted entropies are successfully stored in file system 106. When a key is requested, processor 102 may send the encrypted entropy to SEP 112 through buffer 108. SEP 112 may provide the key if the encrypted entropy has the same value as the entropy seed 330 in SEP memory 118.

Because space in SEP memory 118 may be limited, SEP 112 may allow deletion of OS keys and/or entropies. For example, SEP 112 may establish key slots in SEP memory 118 for OS keys and/or entropies. In some implementations, SEP memory 118 may include 48 key slots. When processor 102 is registering a new OS instance, processor 102 may send a request to SEP 112 through buffer 108 to check whether there are available key slots in SEP memory 118. SEP 112 may check to see whether there are available slots. If there are one or more open slots, SEP 112 may return a code to processor 102 allowing creation of a new OS instance, and key generation may proceed as described above. If there are no open slots, SEP 112 may return a code to processor 102 denying creation of the new OS instance. To free up slots, processor 102 may remove one or more OS partitions, for example by wiping a partition in file system 106. As part of an operation to wipe the partition, processor 102 can send a message to SEP 112 indicating that the partition is no longer valid. SEP 112 can delete the OS key and/or entropy for that partition, freeing up a slot in SEP memory 118.

Figure 3D:
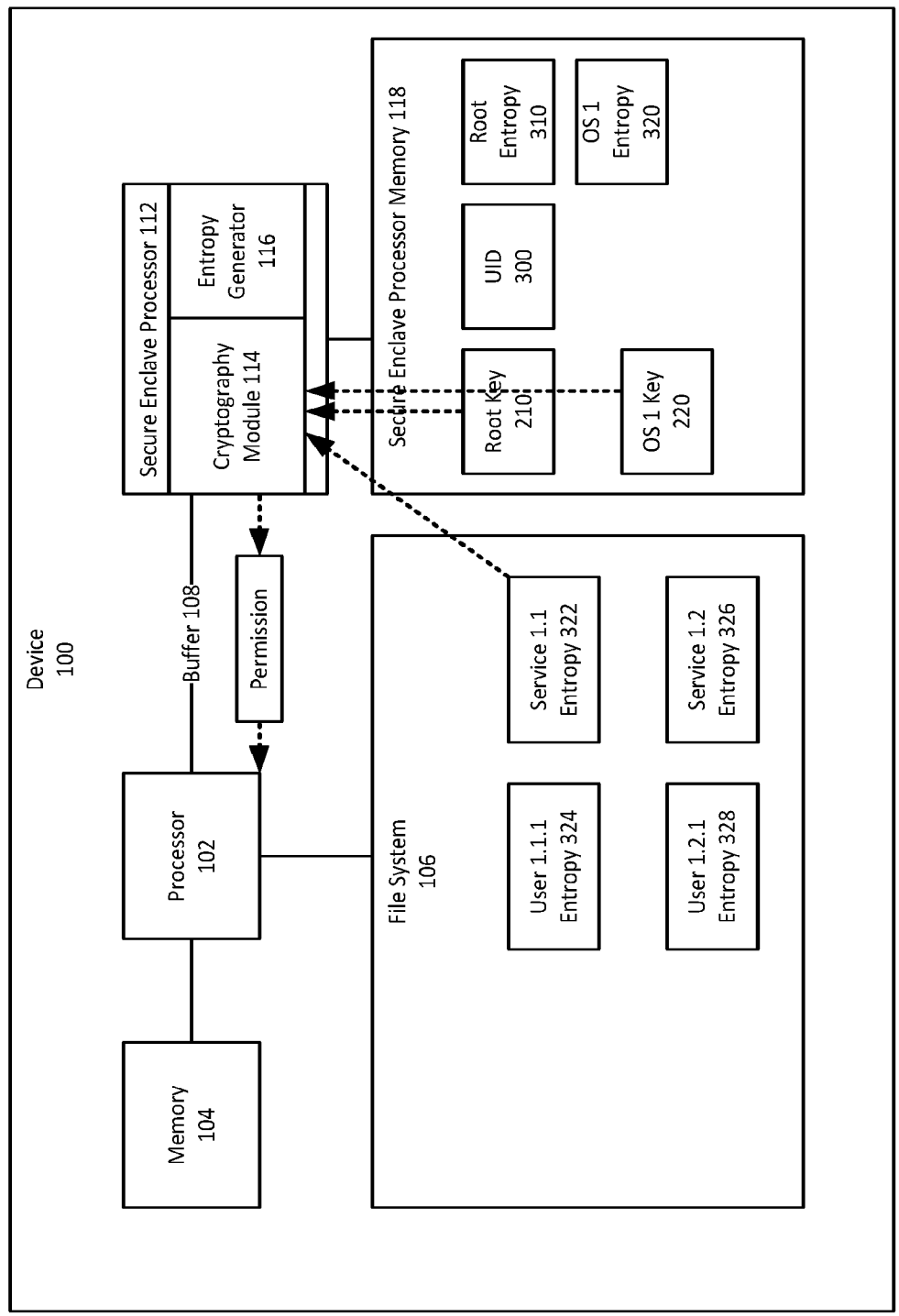
FIG. 3D illustrates an example of entropy decryption.

FIG. 3D illustrates an example of entropy decryption. SEP 112 can decrypt an entropy stored in file system 106 and return a key when the key is needed to access protected information. For example, processor 102 may send service 1.1.1 entropy 322 to SEP 112 using buffer 108. Cryptography module can decrypt service 1.1.1 entropy 322 using OS 1 key 220. Cryptography module 114 may apply a hash function to root key 210 using service 1.1.1 entropy 322 as a seed, yielding service 1.1.1 key 222. For example, cryptography module 114 may apply a key derivation function based on a hash message authentication code (HKDF) or other suitable function. SEP 112 can determine the validity of service 1.1.1 key 222 within the secure environment. If service 1.1.1 key 222 is valid, SEP 112 can send a notification to processor 102 through buffer 108 indicating that service 1.1.1 key 222 is valid and that processor 102 has permission to access service 1.1.1. In response to receiving the permission, processor 102 can provide access to service 1.1.1. OS 1 key 220 may be stored unencrypted in SEP memory 118 and therefore inaccessible to processor 102. Accordingly, SEP 112 may require data stored in SEP memory 118 to decrypt entropies stored in file system 106. The entropies stored in file system 106 are afforded the same level of security as if they had been stored within SEP memory 118. SEP 112 can determine whether keys are valid without any steps in the determination being performed by processor 102, so the decrypted entropy and key are never present in file system 106.

Figure 3E:
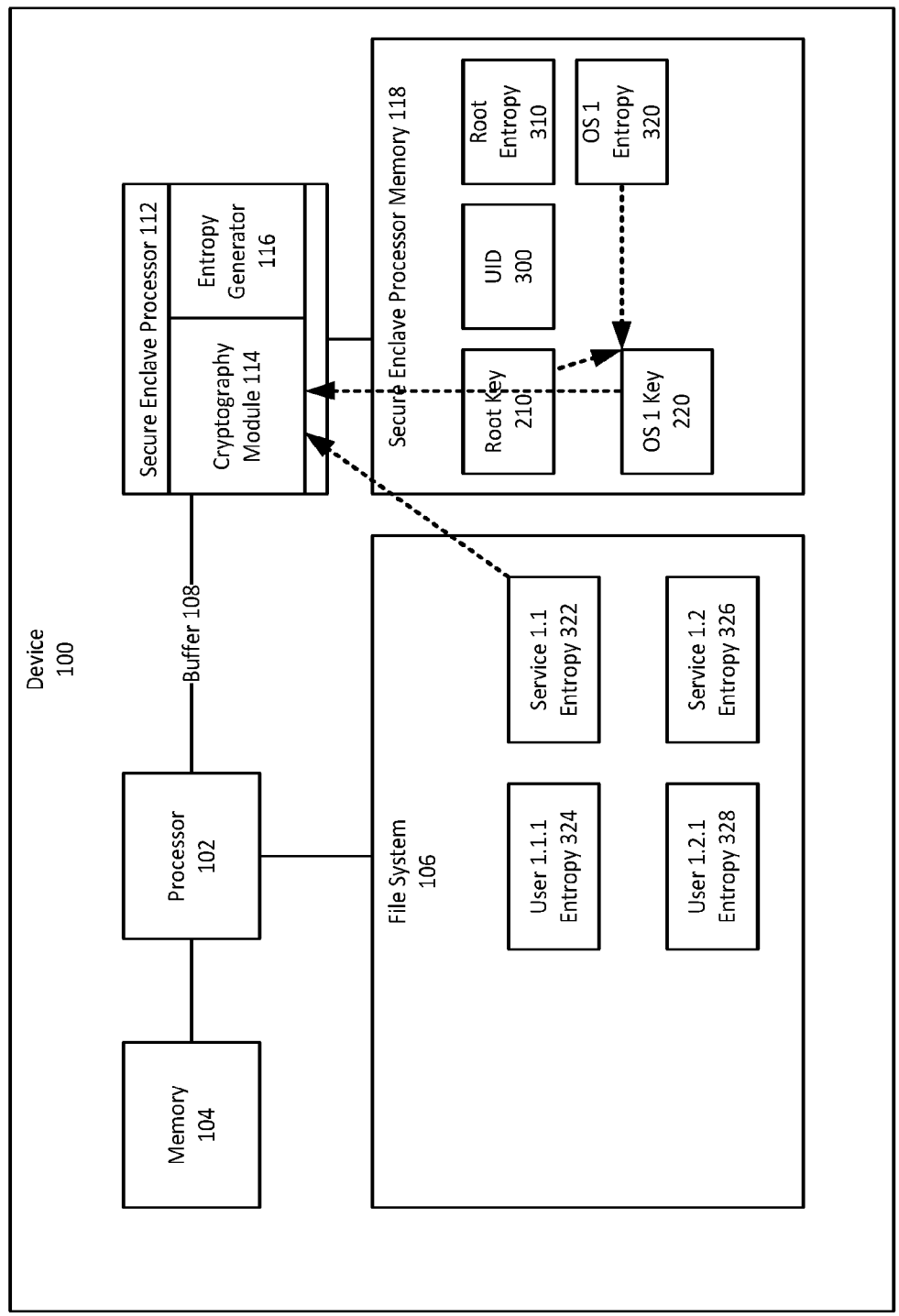
FIG. 3E illustrates an example of key creation and decryption upon device boot.

FIG. 3E illustrates an example of key creation and decryption upon device 100 boot. As noted above, SEP 112 may generate keys from entropy values dynamically. Accordingly, after device 100 boots, SEP 112 may regenerate keys stored in SEP memory 118. For example, SEP 112 may apply a hash function to root key 210 using OS 1 entropy 320 stored in SEP memory 118 as a seed, yielding OS 1 key 220. As long as OS 1 entropy 320 in SEP memory 118 has not changed since the previous device 100 boot, the resulting OS 1 key 220 may be the same key as it was when it was generated prior to device 100 reboot. Accordingly, when SEP 112 attempts to decrypt entropy stored in file system 106 after the reboot, decryption may proceed as in the example of FIG. 3D. Cryptography module can decrypt service 1.1.1 entropy 322 using the new OS 1 key 220 and the credential, because the new OS 1 key 220 has the same value as it did after previous boots.

FIG. 3E illustrates a situation wherein device 100 reboots, and OS 1 entropy 320 has not changed. However, SEP 112 can change entropies stored in SEP memory 118. For example, SEP 112 may change an entropy to invalidate entropies and/or keys on lower levels of entropy tree 200.

Figure 3F:
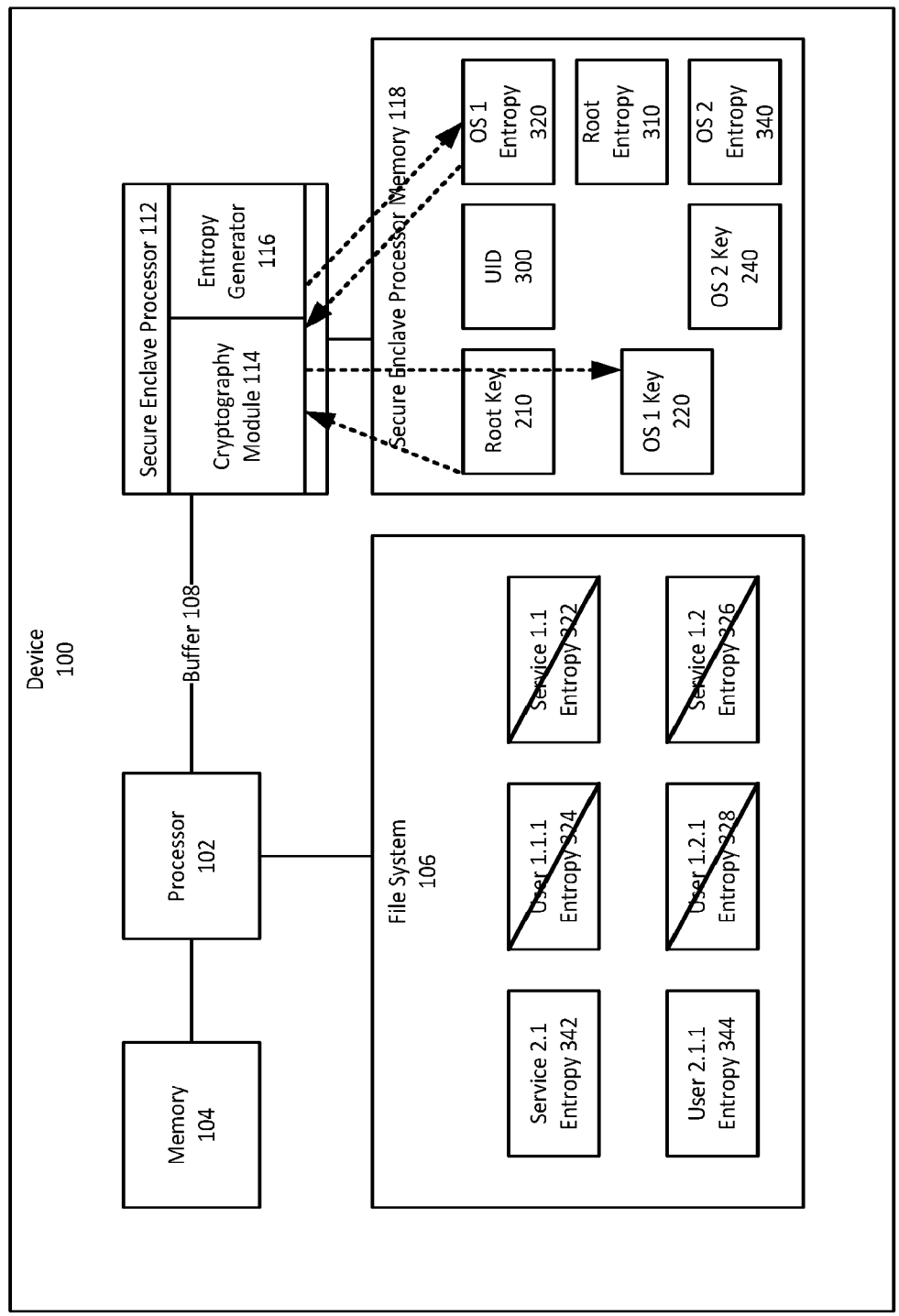
FIG. 3F illustrates an example of key invalidation.

FIG. 3F illustrates an example of key invalidation performed by changing OS 1 entropy 320. Entropy generator 116 may generate a new value for OS 1 entropy 320 and replace the previous OS 1 entropy value with the new value. For example, when device 100 reboots, OS 1 key 220 can be generated from the new OS 1 entropy 320 and be different from the OS 1 key used to generate the entropies in file system 106. If a user attempts to access data protected by a key in a branch of entropy tree 300 based on OS 1 key 220, SEP 112 may be unable to decrypt it. For example, processor 102 may send service 1.1.1 entropy 322 to SEP 112 using buffer 108. Because OS 1 key 220 is not the key used to encrypt service 1.1.1 entropy 322, service 1.1.1 entropy 322 may fail as a credential. When cryptography module 114 attempts to decrypt service 1.1.1 entropy 322, the operation may fail.

FIG. 3F also illustrates OS 2 entropy 340 and OS 2 key 240. OS 2 entropy 340 and OS 2 key 240 may have been generated by the same processes used to generate OS 1 entropy 320 and OS 1 key 220, respectively. In the example of FIG. 3F, OS 1 entropy 320 has been changed, but OS 2 entropy 340 has not. Accordingly, service 2.1 entropy 342 and user 2.1.1 entropy 344 in file system 106 may still be valid.

SEP 112 may change any entropy stored in SEP memory 118 to invalidate any key or set of keys. Changing an entropy may invalidate anything stored in file system 106 on a lower level of the tree from the level associated with the entropy. For example, a user may be selling device 100. Device 100 may have 10 different OS instances. Due to entropy tree 200, entropies for elements of the different instances stored in file system 106 may not have to be invalidated individually. Indeed, the user may not require access to one or more of the OS instances in order to invalidate the keys in those OS instances. If SEP 112 changes entropy values inside SEP memory 118, SEP 112 may no longer be able to decrypt entropies in file system 106. Accordingly, the user may be assured that future users of device 100 cannot recover the user's private data. This invalidation technique may provide cryptographic invalidation, so the keys cannot be recovered.

Different entropy tree structures may provide different options for bulk invalidations. For example, FIGS. 2A and 2B show two different entropy trees 200 and 201, the first including OS entropies inside SEP memory 118, and the second having only root key 210 inside SEP memory 118. Entropies in file system 106 may be invalidated in bulk by changing an entropy value for the lowest key level stored inside SEP memory 118. Accordingly, entropy tree 200 may provide flexibility to bulk invalidate keys lower than the OS level on an OS instance by OS instance basis. On the other hand, entropy tree 201 may require a change in root entropy 310 to perform bulk invalidation, and may therefore invalidate every OS instance at the same time.

Fault Tolerant Key Modification

SEP 112 may modify keys stored in file system 106. For example, SEP 112 can generate a new entropy for a service or user, create a new key using the new entropy, encrypt the new entropy, and store the encrypted new entropy in file system 106. Creating and storing new keys and/or entropies may proceed generally as described with respect to FIGS. 3A-3F. In some implementations, SEP 112 may provide fault tolerance in case entropy creation fails or device 100 restarts before entropy creation is complete, for example.

SEP 112 may retain an old entropy until new entropy creation is verified to be successful. The new entropy used to create the new key may be a "proposed" entropy, and the retained old entropy may be a "current" entropy. FIGS. 4A-4D illustrate creation and use of proposed entropy for fault tolerance.

Figure 4A:
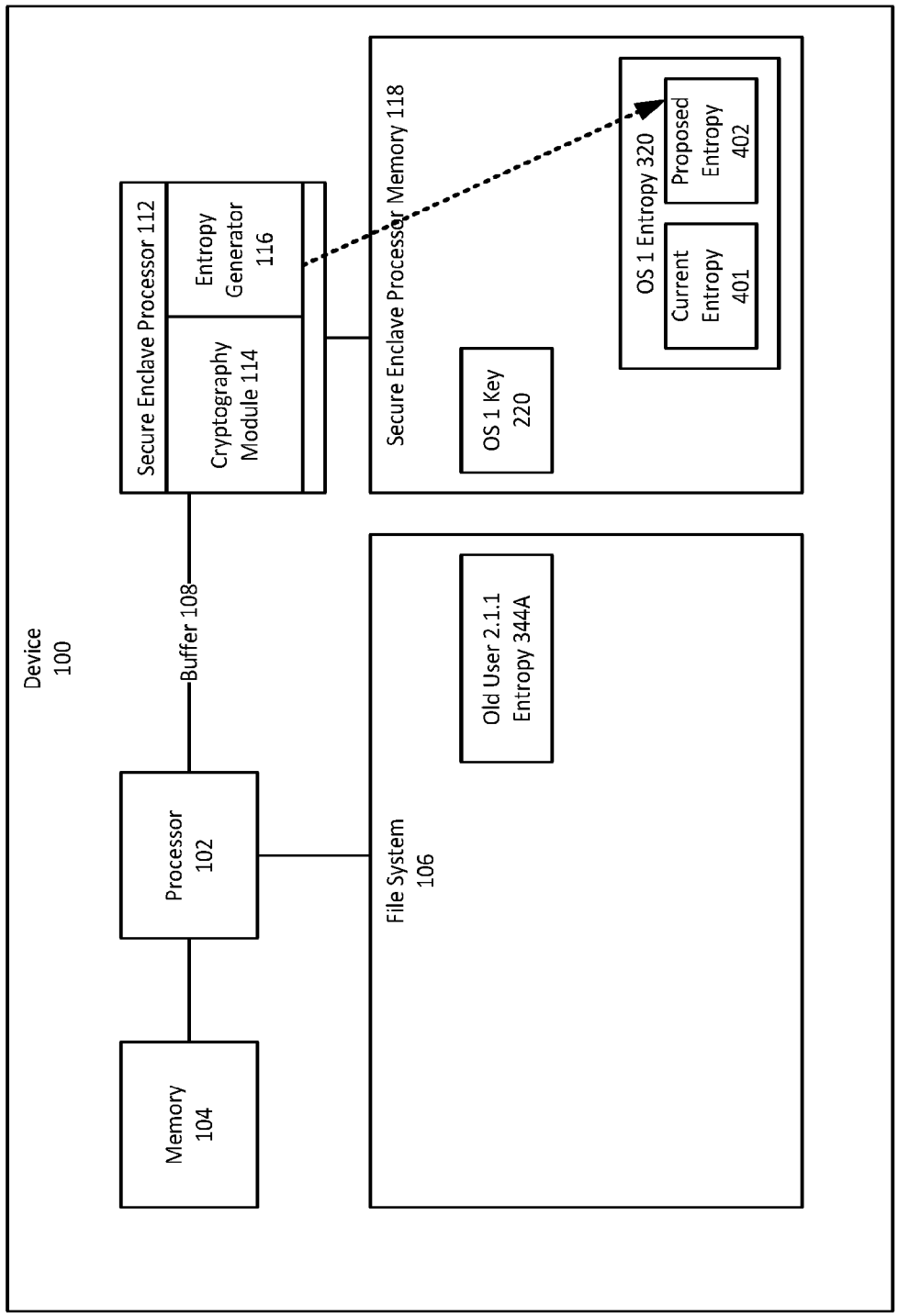
FIGS. 4A-4D illustrate example fault tolerance features.

FIG. 4A shows device 100 when old user 2.1.1 entropy 344A is about to be replaced. Old user 2.1.1 entropy 344A may have been encrypted using current entropy 401. Entropy generator may create proposed entropy 402.

Figure 4B:
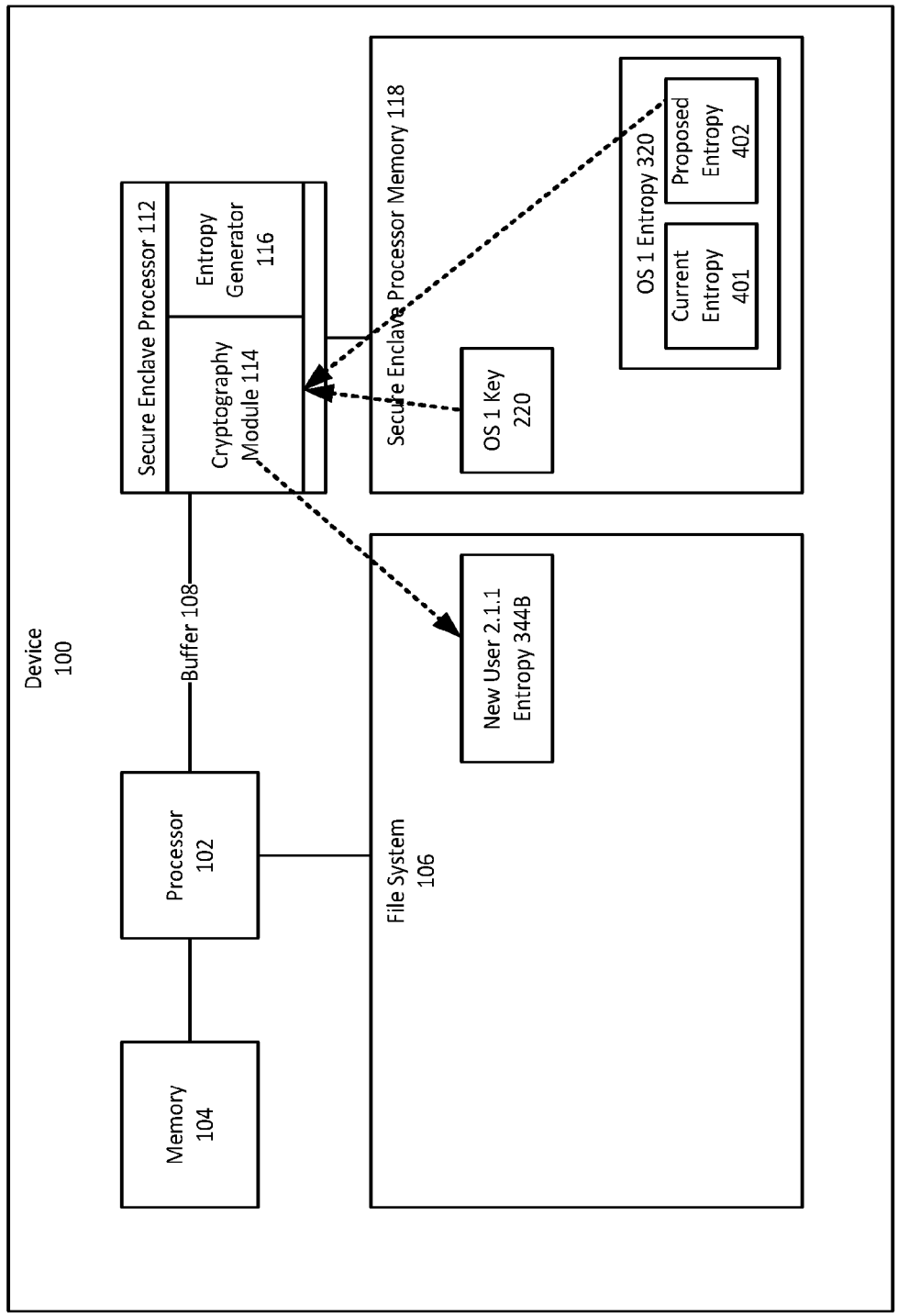

FIG. 4B shows device 100 when old user 2.1.1 entropy 344A is being replaced. Cryptography module 114 may use proposed entropy 402 and OS 1 key 220 to create new user 2.1.1 entropy 344B. Processor 102 may store new user 2.1.1 entropy 344B in file system 106.

SEP memory 118 may retain both current entropy 401 and proposed entropy 402. Retaining both entropies may provide fault tolerance. For example, assume a write failure occurs when processor 102 attempts to store new user 2.1.1 entropy 344B in file system 106. Accordingly, old user 2.1.1 entropy 344A may still be in file system 106. After device 100 reboot, SEP 112 may create OS 1 key 220 using proposed entropy 402. When processor 102 requests decryption of old user 2.1.1 entropy 344A, SEP 112 may attempt to decrypt old user 2.1.1 entropy 344A using OS 1 key 220 and fail. However, because current entropy 401 is still in SEP memory 118, SEP 112 may regenerate OS 1 key 220 using current entropy 401 and retry the decryption. If decryption succeeds, SEP 112 may determine that the user 2.1.1 entropy update attempt failed and may retry the update.

In another example, assume processor 102 successfully writes new user 2.1.1 entropy 344B in file system 106 but does not inform SEP 112 of the successful write. SEP 112 may assume write failure and continue to use OS 1 key 220 based on current entropy 401. When processor 102 requests decryption of new user 2.1.1 entropy 344B, SEP 112 may attempt to decrypt new user 2.1.1 entropy 344B using OS 1 key 220 and fail. However, because proposed entropy 402 is still in SEP memory 118, SEP 112 may regenerate OS 1 key 220 using proposed entropy 402 and retry the decryption. If decryption succeeds, SEP 112 may determine that the user 2.1.1 entropy update attempt succeeded and may use OS 1 key 220 created using proposed entropy 402 moving forward.

Figure 4C:
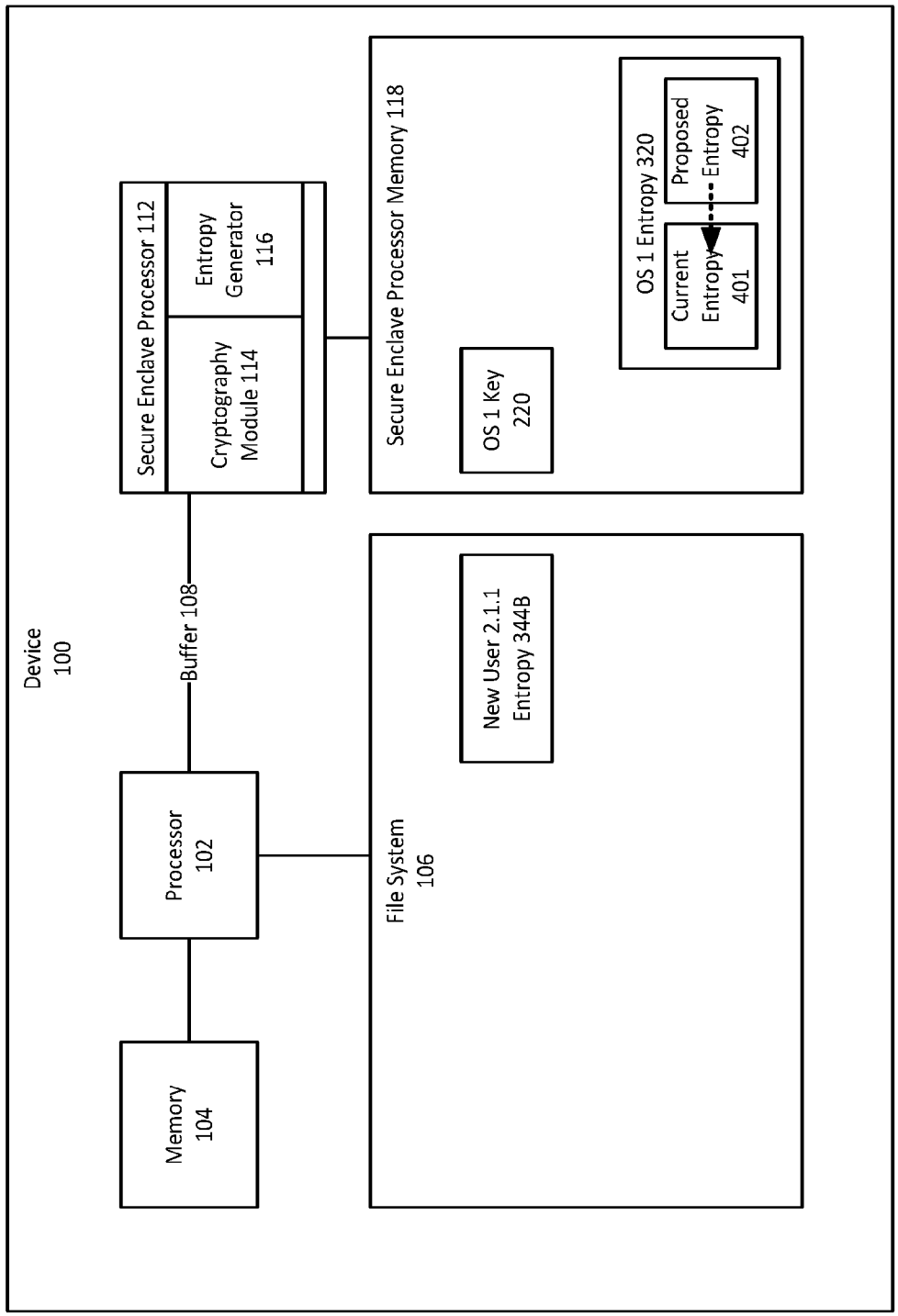
Figure 4D:
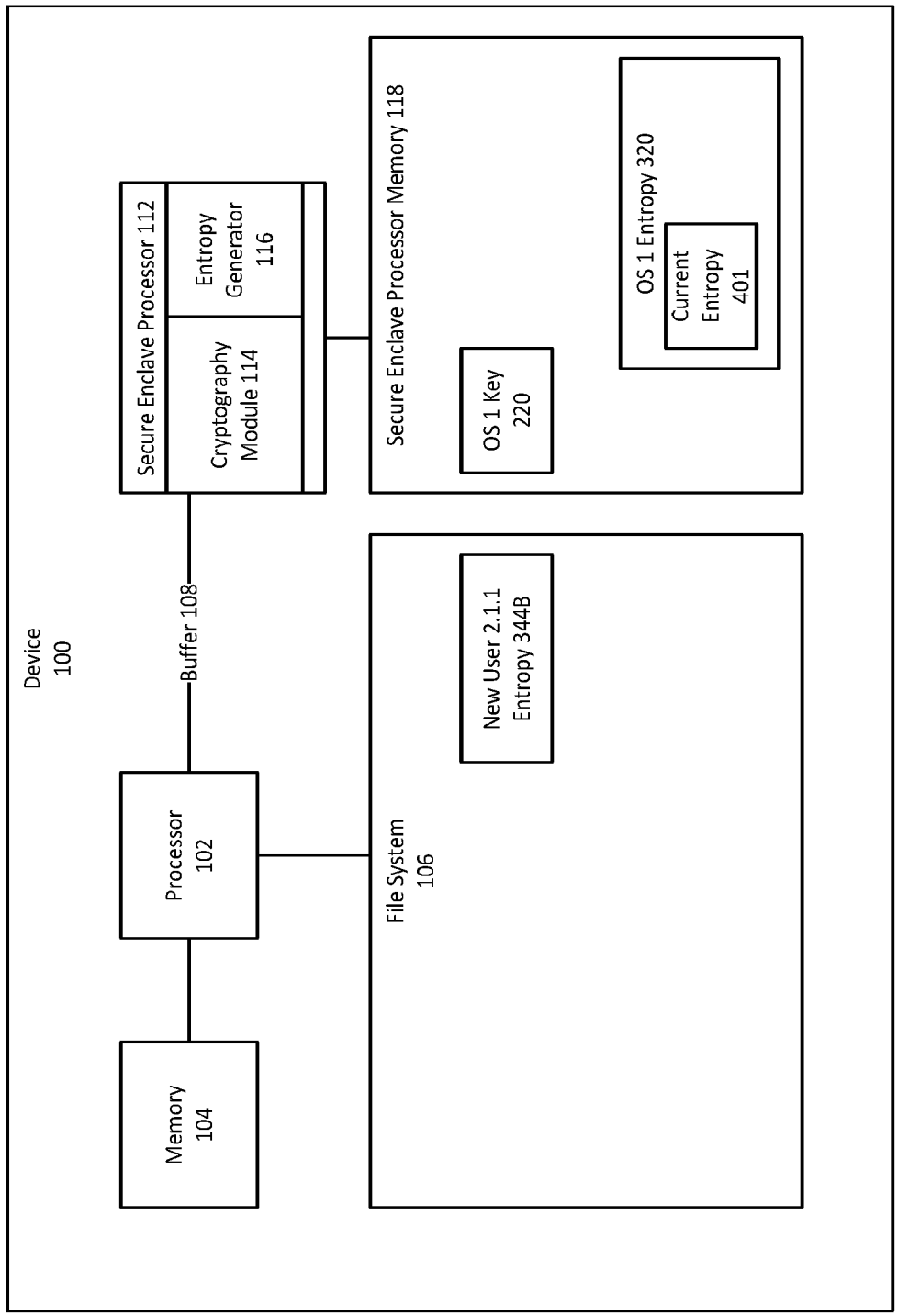

FIGS. 4C-4D show device 100 when new user 2.1.1 entropy 344B has been successfully saved in file system 106. After successfully decrypting new user 2.1.1 entropy 344B, SEP 112 may write proposed entropy 402 as current entropy 401. Accordingly, OS 1 entropy 320 may have a single, correct entropy value for future operations.

Example Processes

Figure 5:
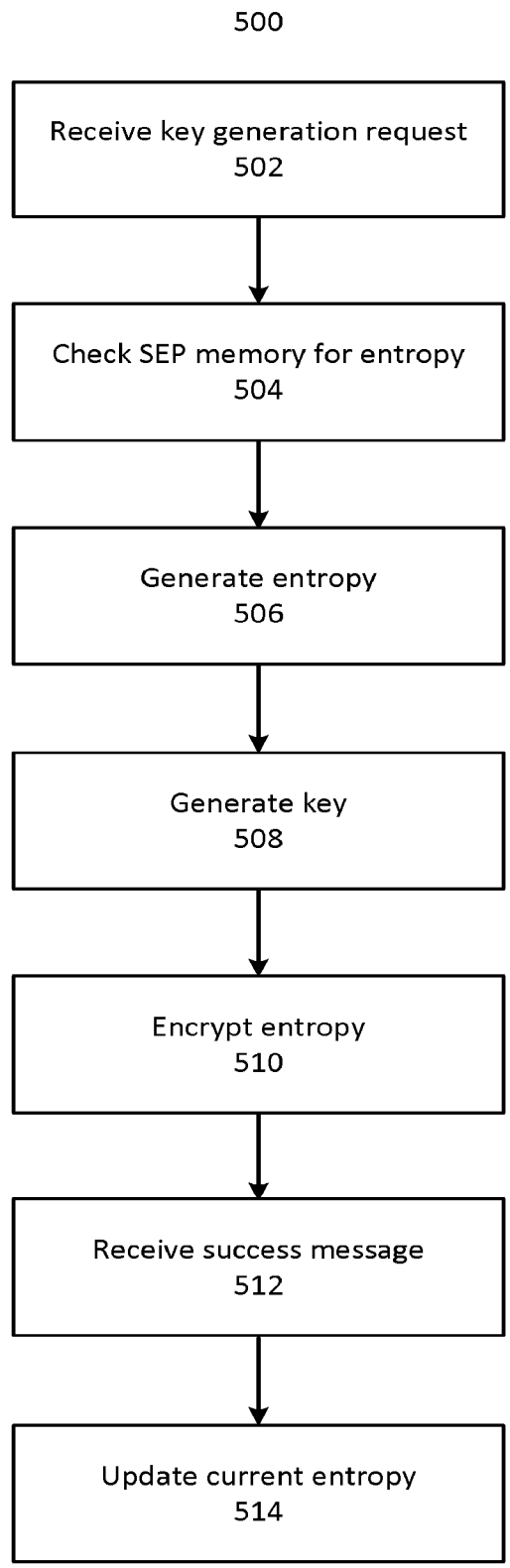
FIG. 5 is a flow diagram of an example key creation process.

FIG. 5 is a flow diagram of an example key creation process 500. SEP 112 may perform process 500 when an OS instance, service instance, user instance, or other protected element requests a key for the first time. For example, when a user creates sensitive information by setting up a fingerprint reader with the user's fingerprint for the first time, a fingerprint reader service may request a key from SEP 112. Since the fingerprint reader service has not yet been set up, SEP 112 may perform process 500 to create a key for the fingerprint reader service.

At step 502, SEP 112 may receive a key generation request. For example, processor 102 may generate the request and send the request to SEP 112 through buffer 108. The request may identify the instance requesting the key. In the example of process 500, the instance is a service instance such as the fingerprint reader service.

At step 504, SEP 112 may determine whether entropy already exists for the service instance. For example, SEP 112 may search SEP memory 118 for a previously generated entropy seed 330 corresponding to the service instance requesting the key. For example, SEP 112 may tag each entropy seed 330 in SEP memory 118 with an identifier describing the corresponding service instance upon entropy seed 330 creation. SEP 112 may search for an entropy seed 330 having a tag corresponding to the requesting service instance. If SEP 112 does not find a corresponding entropy seed 330, process 500 may continue as shown. See FIG. 6 for an example of how SEP 112 can process a request when the corresponding entropy seed 330 is found.

At step 506, entropy generator 116 may generate an entropy seed 330 for the requesting service instance. For example, entropy seed 330 may include a proposed entropy value. If no current entropy value exists, entropy generator 116 may also generate a current entropy value in some implementations.

At step 508, cryptography module 114 may generate a key. For example, cryptography module 114 may apply a hash function to root key 210 and/or the OS key for the current OS instance (e.g., OS 1 key 220) using the proposed entropy value as a seed, yielding the requested key. For example, SEP 112 may apply HKDF or another suitable function.

At step 510, cryptography module 114 may encrypt entropy seed 330. For example, cryptography module 114 may apply AES-256-CBC or another suitable function. SEP 112 may send the encrypted entropy through buffer 108 to processor 102 for storage in file system 106.

At step 512, SEP 112 may receive an indication that the encrypted entropy has been stored in file system 106. For example, processor 102 may respond through buffer 108 to SEP 112, acknowledging successful storage of the encrypted entropy in file system 106.

At step 514, if the entropy has been successfully stored in file system 106, SEP 112 may update the current entropy value for the instance. For example, SEP 112 may write the proposed entropy as the current entropy for the instance in SEP memory 118 and discard the old current entropy value.

Figure 6:
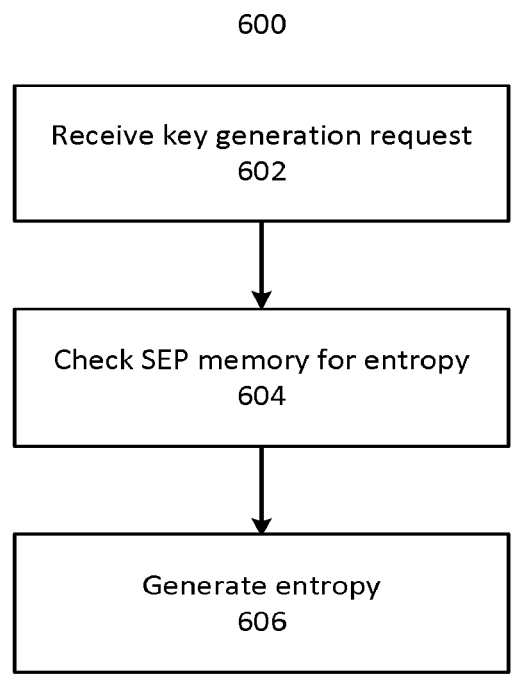
FIG. 6 is a flow diagram of an example error process.

FIG. 6 is a flow diagram of an example error process 600. SEP 112 may perform process 600 when an OS instance, service instance, user instance, or other protected element requests initial creation of a key for which entropy already exists. For example, if SEP 112 receives such a request, SEP 112 may interpret the request as an indication that the client is attempting to access protected data without authorization.

At step 602, SEP 112 may receive a key generation request. For example, processor 102 may generate the request and send the request to SEP 112 through buffer 108. The request may identify the instance requesting the key. In the example of process 600, the instance is a service instance such as the fingerprint reader service.

At step 604, SEP 112 may determine whether entropy has already been generated for the service instance. For example, SEP 112 may search SEP memory 118 for a previously generated entropy seed 330 corresponding to the service instance requesting the key. For example, SEP 112 may tag each entropy seed 330 in SEP memory 118 with an identifier describing the corresponding service instance upon entropy seed 330 creation. SEP 112 may search for an entropy seed 330 having a tag corresponding to the requesting service instance. If SEP 112 finds corresponding entropy seed 330, process 600 may continue as shown. See FIG. 5 for an example of how SEP 112 can process a request when no corresponding entropy seed 330 is found.

At step 606, entropy generator 116 may reset the corresponding entropy seed 330. For example, entropy generator 116 may generate a new proposed entropy value and current entropy value for the corresponding entropy seed 330. SEP 112 may send a message to processor 102 using buffer 108 indicating that the attempt to create a new key has failed.

Figure 7:
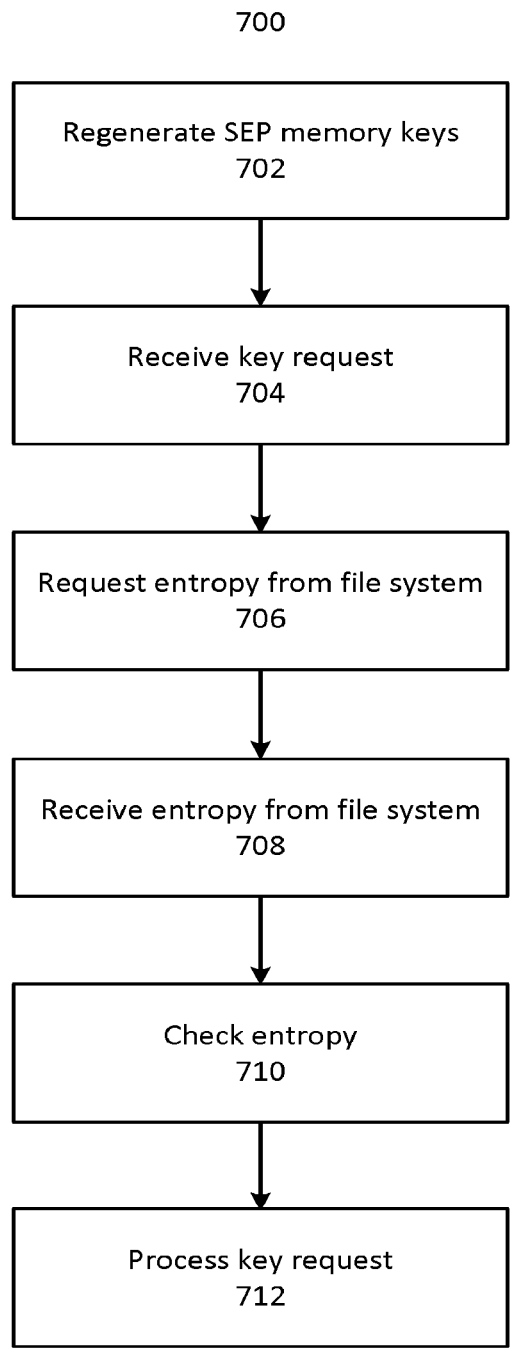
FIG. 7 is a flow diagram of an example post-boot process.

FIG. 7 is a flow diagram of an example post-boot process 700. The process 700 may be performed after device 100 boots or reboots. As noted above, SEP 112 may regenerate keys in SEP memory 118 upon device 100 boot. SEP 112 may also check entropy stored in file system 106.

At step 702, SEP 112 may regenerate keys stored in SEP memory 118. For example, for each OS instance, SEP 112 may apply a hash function to root key 210 using the OS entropy stored in SEP memory 118 as a seed, yielding the OS key. As long as the OS entropy in SEP memory 118 has not changed since the previous device 100 boot, the resulting OS key may be the same key as it was when it was generated prior to device 100 reboot.

At step 704, SEP 112 may receive a key processing request from processor 102 through buffer 108. SEP 112 may wait to receive a key processing request, such as a request to create a key or decrypt an entropy, to continue the post-boot process 700. This is because at the time of SEP 112 boot up, the state of processor 102 may be unknown. For example, processor 102 may be running in a recovery mode, install mode, or other mode without access to entropy data in file system 106. SEP 112 may determine from the key processing request that processor 102 has access to the entropy data in file system 106 and continue the post-boot process 700.

At step 706, SEP 112 may request the entropy data in file system 106. For example, SEP 112 may send a request for the entropy data to processor 102 through buffer 108. SEP 112 may request only entropies that are relevant to the key processing request from step 704. In some implementations, SEP 112 may request all entropies on file system 106. SEP 112 may request the entropies using a single request, or SEP 112 may request the entropies sequentially and process each entropy separately according to the following steps.

At step 708, SEP 112 may receive the requested entropies. For example, processor 102 may place the entropies in buffer 108, and SEP 112 may retrieve the entropies from buffer 108. SEP 112 may also receive data describing the entropies, for example data describing an instance associated with an entropy, a partition associated with the entropy, a user ID associated with the entropy, etc.

At step 710, SEP 112 may check the received entropies. For example, SEP 112 may attempt to decrypt the entropies to determine whether they are valid. Cryptography module 114 can decrypt a received entropy using the OS key related to the entropy in entropy tree 200 and related entropy seed 330. If cryptography module 114 decrypts the entropy, SEP 112 can determine that the entropy is valid. If cryptography module 114 decrypts the entropy using current entropy when proposed entropy was expected to work, SEP 112 may determine that a previous update attempt for the key failed. If cryptography module 114 decrypts the entropy using proposed entropy when current entropy was expected to work, SEP 112 may determine that a previous update attempt for the key succeeded but was not reported by processor 102. If cryptography module 114 fails to decrypt the entropy, SEP can determine that the key is invalid.

At step 712, SEP 112 may process the key processing request. For example, if the request is a request to generate a new key and no entropy is already present, SEP 112 may create a new entropy and key responsive to the request. If the request is a request to decrypt an entropy, SEP 112 may attempt to decrypt the entropy and either return key information if successful or return an error if unsuccessful.

Figure 8:
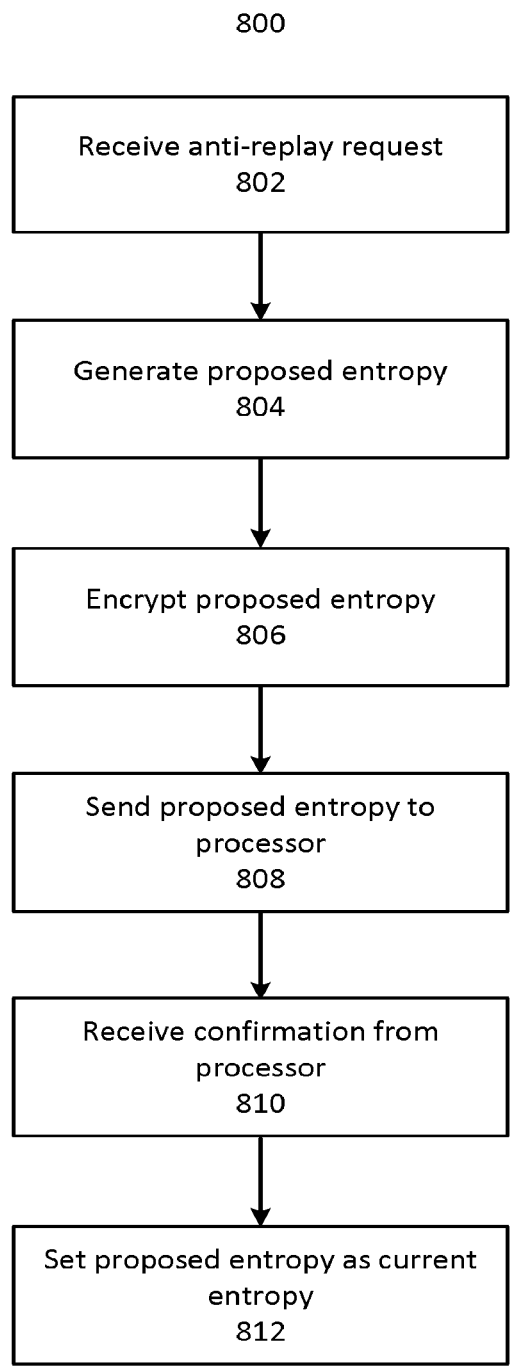
FIG. 8 is a flow diagram of an example anti-replay process.

FIG. 8 is a flow diagram of an example anti-replay process 800. A user of device 100 may wish to invalidate one or more keys. For example, as discussed above, the user may wish to sell device 100 and invalidate all keys. In other cases, the user may wish to invalidate keys for one or more specific partitions, services, or users. Device 100 may perform anti-replay process 800 to invalidate one or more keys.

At step 802, SEP 112 may receive an anti-replay request. An anti-replay request may be a request to change a key to invalidate that key. As noted above, invalidating a key that is the subject of the request may also invalidate every key below the subject key in entropy tree 200. Accordingly, the anti-replay request may be a single-key anti-replay request when the subject key has no dependent keys in entropy tree 200 or a bulk anti-replay request when the subject key has dependent keys in entropy tree 200. For example, SEP 112 may receive the anti-replay request from processor 102 through buffer 108.

At step 804, entropy generator 116 may generate a new proposed entropy for the subject key. SEP 112 may store the proposed entropy in SEP memory 118 along with the current entropy for the subject key.

At step 806, cryptography module 114 may encrypt the new proposed entropy. For example, cryptography module 114 may apply AES-256-CBC or another suitable function.

At step 808, SEP 112 may send the new encrypted proposed entropy to processor 102 for storage in file system 106. For example, SEP 112 may send the new encrypted proposed entropy through buffer 108 to processor 102. Processor 102 may store the new encrypted proposed entropy in file system 106.

At step 810, SEP 112 may receive a confirmation message from processor 102. For example, processor 102 may place a confirmation message in buffer 108, and SEP 112 may retrieve the confirmation message from buffer 108. The confirmation message may report that processor 102 successfully saved the new encrypted proposed entropy in file system 106.

At step 812, SEP 112 may set the proposed entropy as the current entropy. For example, SEP 112 may delete the current entropy from SEP memory 118 and set the proposed entropy as the current entropy in SEP memory 118. In another example, SEP 112 may overwrite the current entropy with the proposed entropy value and either delete the proposed entropy or create a new proposed entropy value for a future iteration of anti-replay process 800. When the proposed entropy value has been set as the current entropy, meaning the entropy value used to generate the new key is the current entropy, SEP 112 may be able to decrypt the new proposed entropy in the future. Any attempts to decrypt the subject key that was replaced may fail, because SEP memory 118 no longer stores the entropy value used to create the subject key.

Graphical User Interfaces

This disclosure above describes various GUIs for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 9:
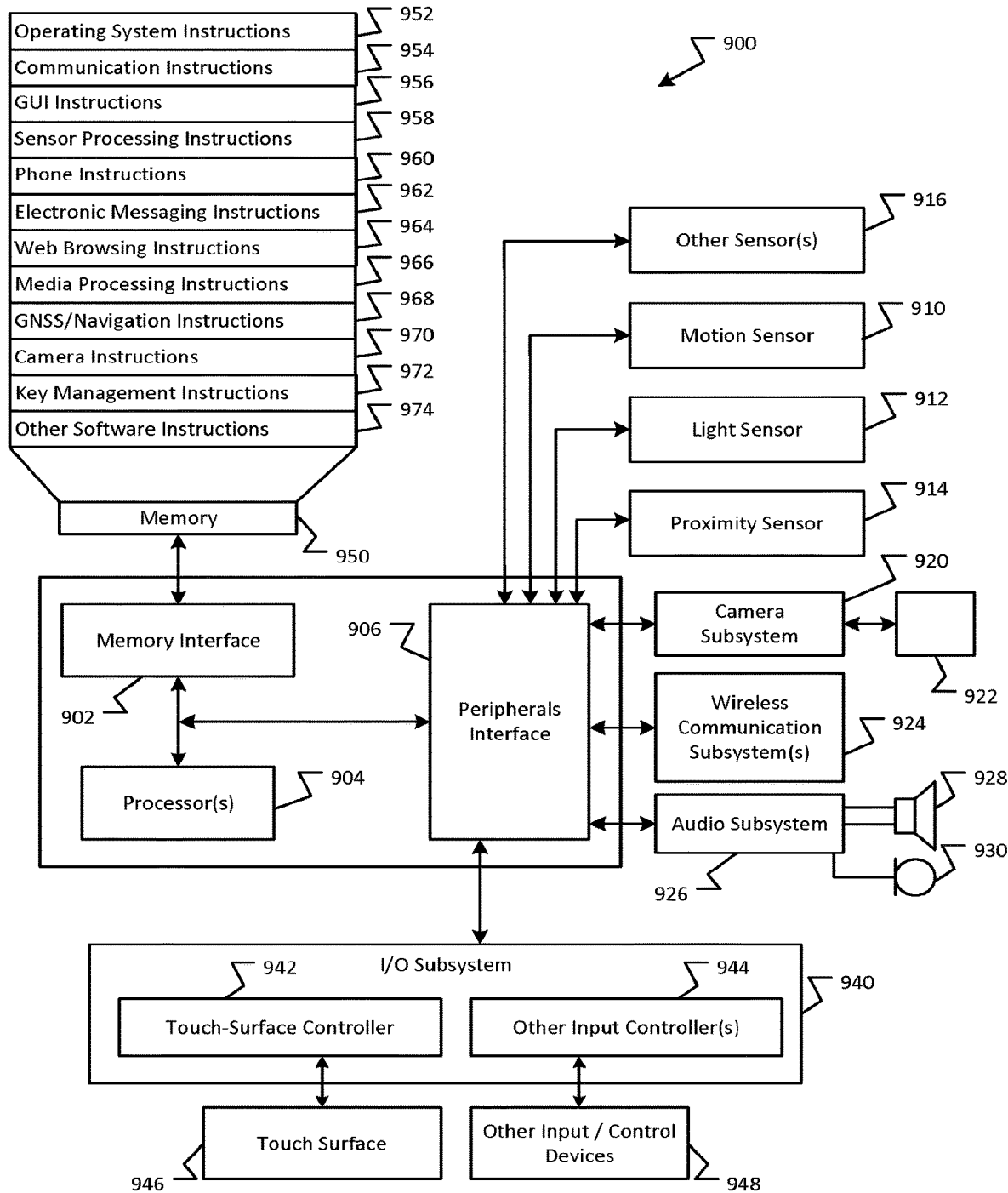
FIG. 9 is a block diagram of an example system architecture implementing the features and processes of FIGS. 1-8.

FIG. 9 is a block diagram of an example computing device 900 that can implement the features and processes of FIGS. 1-8. The computing device 900 can include a memory interface 902, one or more data processors, SEPs, image processors, and/or central processing units 904, and a peripherals interface 906. The memory interface 902, the one or more processors 904, and/or the peripherals interface 906 can be separate components or can be integrated in one or more integrated circuits. The various components in the computing device 900 can be coupled by one or more communication buses or signal lines. As described above, the SEP may be inaccessible to other components of the computing device 900 except through a specific register. The SEP may also include secure SEP memory only accessible to the SEP.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, magnetometer or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the device 900 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voiceprinting and voice authentication, for example.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™. The computing device 900 can, therefore, include a 36-pin connector that is compatible with the iPod. Other input/output and control devices can also be used.

The memory interface 902 can be coupled to memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing voice authentication. For example, operating system 952 can implement the key storage and SEP request features as described with reference to FIGS. 1-8.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store key management instructions 972 to facilitate other processes and functions, such as the key storage and request processes and functions as described with reference to FIGS. 1-8.

The memory 950 can also store other software instructions 974, such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computing device, comprising:
a main processor;
an accessible memory accessible to the main process; and
a secure processor coupled to secure memory inaccessible to the main processor, and wherein the secure processor is configured to:
store a first cryptographic key in the secure memory;
use the first cryptographic key to encrypt a plurality of entropy values;
store the encrypted plurality of entropy values in the accessible memory;
receive, from the main processor, a request for a second cryptographic key;
in response to the request:
request, from the accessible memory, an encrypted entropy value of the encrypted plurality of entropy values associated with the second cryptographic key;
decrypt the encrypted entropy value with the first cryptographic key in the secure memory; and
derive the second cryptographic key by applying a key derivation function (KDF) to the decrypted entropy value to produce the second cryptographic key for decrypting data in the accessible memory.

2. The computing device of claim 1, wherein the secure processor is further configured to:
receive, from the main processor, a key generation request to generate a third cryptographic key;
in response to the key generation request:
generate a new entropy value for deriving the third cryptographic key;
apply a KDF to the new entropy value to derive the third cryptographic key;
encrypt the new entropy value with the first cryptographic key; and
send the encrypted new entropy value to the main processor for storage in the memory accessible to the main processor to enable a subsequent derivation of the third cryptographic key.

3. The computing device of claim 2, wherein the key generation request causes the secure processor to replace a previous cryptographic key with the third cryptographic key; and
wherein the secure processor is further configured to:
retain an entropy value used to derive the previous cryptographic key until storage of the encrypted new entropy value is confirmed by the main processor.

4. The computing device of claim 1, wherein the secure processor is further configured to:
prevent the cryptographic keys from being derived based on the encrypted plurality of entropy values by removing, from the secure memory, a first entropy value used to derive the first cryptographic key that encrypts the plurality of entropy values.

5. The computing device of claim 1, wherein the secure processor is further configured to:
derive a root key by applying a KDF to a root entropy value stored in the secure memory; and
derive the first cryptographic key by using the root key to apply a KDF to a first entropy value stored in the secure memory.

6. The computing device of claim 5, wherein the secure processor is further configured to:
derive the root key and the first cryptographic key during a boot process of the computing device.

7. The computing device of claim 5, wherein the secure processor is further configured to:
store a unique identifier inaccessible to the main processor; and
derive the root key based on the unique identifier and the root entropy value.

8. The computing device of claim 1, wherein the first cryptographic key is associated with a first of a plurality of operating systems in the memory accessible to the main processor, and wherein each of the encrypted plurality of entropy values is used to derive a cryptographic key encrypting data associated with the first operating system.

9. The computing device of claim 1, wherein the first cryptographic key is associated with a first of a plurality of partitions in the memory accessible to the main processor, and wherein each of the encrypted plurality of entropy values is used to derive a cryptographic key encrypting data within the first partition.

10. The computing device of claim 1, wherein the secure processor is further configured to communicate with the main processor via a secure mailbox circuit.

11. A non-transitory computer readable medium having program instructions stored therein that are executable by a computing device to cause the computing device to perform operations comprising:
  accessing, by a first processor of the computing device, a file system that includes encrypted data and a plurality of encrypted entropy values; and
  sending, by the first processor, an encrypted entropy value of the plurality of encrypted entropy values to a second secure processor of the computing device, wherein the secure processor is configured to decrypt the encrypted entropy value with a first cryptographic key stored in secure memory inaccessible to the first processor, and wherein the secure processor is configured to apply a key derivation function (KDF) to the decrypted entropy value to produce a second cryptographic key for decrypting data in the file system.

12. The computer readable medium of claim 11, wherein the operations further comprise:
  sending, by the first processor, a request for the secure processor to create a third cryptographic key, wherein the secure processor is configured to generate a new entropy value for deriving the third cryptographic key and to encrypt the new entropy value with the first cryptographic key;
  receiving, by the first processor, the encrypted new entropy value from the second secure processor; and
  storing, by the first processor, the received encrypted new entropy value in the file system.

13. The computer readable medium of claim 12, wherein the operations further comprise:
  sending, by the first processor, a confirmation that the encrypted new entropy value has been successfully stored, wherein the secure processor is configured to maintain, until the confirmation is sent, a previous entropy value associated with a cryptographic key being replaced by the third cryptographic key.

14. The computer readable medium of claim 11, further comprising:
  receiving, from a user, a request to invalidate the cryptographic keys derivable from the plurality of encrypted entropy values; and
  in response to the request, causing the secure processor to remove, from the secure memory, an entropy value used to derive the first cryptographic key during a boot process of the computing device.

15. The computer readable medium of claim 11, wherein the operations further comprise:
  providing the second cryptographic key to a service being executed the computing device.

16. The computer readable medium of claim 11, wherein the operations further comprise:
  performing a boot procedure that includes the secure processor deriving the first cryptographic key based on a first entropy value stored in the secure memory.

17. A method, comprising:
  maintaining, by a computing device, a file system that includes encrypted data and a plurality of encrypted entropy values;
  sending, by a main processor of the computing device, an access request to a secure processor of the computing device;
  in response to the access request:
    receiving, by the secure processor, one of the plurality of encrypted entropy values from the file system;
    using, by the secure processor, a first cryptographic key stored in secure memory to decrypt the received entropy value, wherein the secure memory is inaccessible to the main processor; and
    applying, by the secure processor, a key derivation function to the decrypted entropy value to derive a second cryptographic key that encrypts data stored in the file system.

18. The method of claim 17, further comprising:
  receiving, by the secure processor, a revocation request to revoke access to the second cryptographic key; and
  in response to the revocation request, the secure processor removing the first cryptographic key from the secure memory to prevent a subsequent decryption of the encrypted entropy value and a subsequent derivation of the second cryptographic key.

19. The method of claim 17, further comprising:
  performing, by the computing device, a boot process that includes the secure processor deriving the first cryptographic key based on an entropy value stored in the secure memory, wherein the first cryptographic key protects data of an operating system booted in the boot process.

20. The method of claim 17, further comprising:
  receiving, by the secure processor, a replacement request to replace the second cryptographic key with a third cryptographic key; and
  in response to the replacement request, the secure processor storing the entropy value of the second cryptographic key in the secure memory until the secure processor receives a confirmation that an entropy value of the third cryptographic key has successfully been stored in the file system.

* * * * *